J. LEISENRING.
TROLLEY HANGER.
APPLICATION FILED SEPT. 21, 1915.

1,303,688.

Patented May 13, 1919.

WITNESSES:
P. J. Cadge.
Fred H. Miller.

INVENTOR
John Leisenring.
BY
Wesley G. Carr
ATTORNEY

UNITED STATES PATENT OFFICE.

JOHN LEISENRING, OF SPRINGFIELD, ILLINOIS, ASSIGNOR TO WESTINGHOUSE ELECTRIC AND MANUFACTURING COMPANY, A CORPORATION OF PENNSYLVANIA.

TROLLEY-HANGER.

1,303,688.  Specification of Letters Patent.  Patented May 13, 1919.

Application filed September 21, 1915. Serial No. 51,884.

*To all whom it may concern:*

Be it known that I, JOHN LEISENRING, a citizen of the United States, and a resident of Springfield, in the county of Sangamon and State of Illinois, have invented a new and useful Improvement in Trolley-Hangers, of which the following is a specification.

My invention relates to hangers for trolley conductors and the like, and it has special reference to hangers for catenary trolley construction.

The object of my invention is to provide a simple and inexpensive hanger of the above indicated character having an improved device for connecting the trolley-engaging clamp with the suspension member of the hanger.

Figure 1:
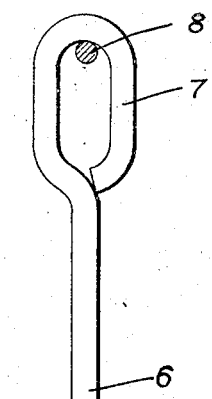
Figure 2:
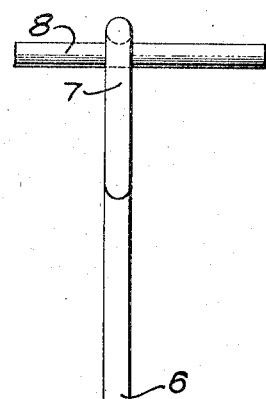
Figure 3:
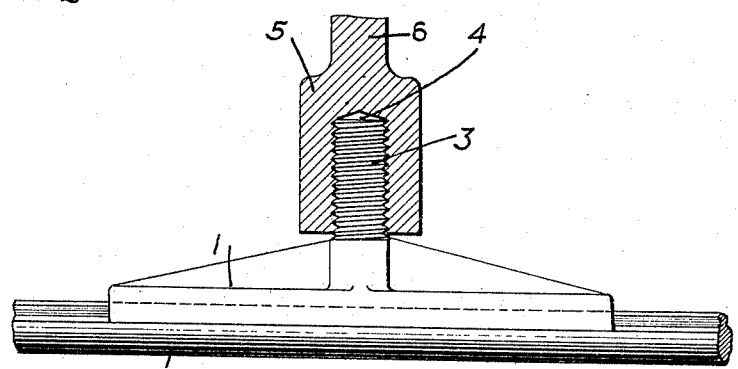

In the accompanying drawing, Figure 1 is an end elevational view of a trolley hanger constructed in accordance with my invention; Fig. 2 is a side elevational view of the device shown in Fig. 1, and Fig. 3 is an enlarged side view, partially in elevation and partially in section, showing certain details of the same device.

The structure shown in the drawing comprises a clamping member 1 for engaging a trolley conductor 2 which is of the so-called "figure 8" cross-sectional form which may, of course, be any usual type of conductor wire. The clamp 1 is provided with an upwardly extending screw-threaded stud 3 which is adapted to be received in an opening 4 formed in the lower enlarged end 5 of an elongated suspension member 6. The upper end of the suspension member 6 is bent into a supporting loop 7 for attachment to a messenger cable 8 or other suitable support.

The suspension member 6 is preferably formed from a single metal rod, the lower end 5 of which is upset or otherwise enlarged and then bored and tapped to coöperate with the screw threads on the stud 3.

The structure which I have shown and described is not only extremely simple and inexpensive, but provides a connection between the trolley clamp and the suspension member which is fuly protected from exposure to the weather and consequent corrosion. This connection is also protected from damage which, in the usual form of trolley conductors, may result from forcible contact with falling objects or with trolley poles.

The details of the structure which I have shown and described may be variously modified by persons skilled in the art without exceeding the limits of my invention. It is therefore to be understood that no restrictions are to be imposed upon my invention except such as are indicated in the appended claims.

I claim as my invention:

1. The combination with a messenger-cable and a trolley conductor, of a two-piece hanger suspended between the same comprising a readily-removable clamp for engaging the conductor and an elongated suspension member having an internally threaded portion at one end for attachment to the clamp and a portion for engaging the messenger-cable at the other end.

2. The combination with a messenger-cable and a trolley conductor, of a two-piece hanger suspended between the same comprising a readily-removable clamp having a screw-threaded stud thereon and jaw portions for gripping the conductor, and an elongated suspension member having at one end an enlarged internally threaded portion for attachment to the stud and at the other end a portion for engaging the messenger-cable.

3. The combination with a messenger-cable and a trolley conductor, of a two-piece hanger suspended between the same comprising a readily-removable clamp having a screw-threaded stud thereon and jaw portions for gripping the conductor, and an elongated suspension member having at one end an enlarged inverted cup-shaped portion that is internally threaded for attachment to the stud and at the other end a portion for engaging the messenger-cable.

In testimony whereof, I have hereunto subscribed my name this fourth day of September, 1915.

JOHN LEISENRING.

Witness:
B. E. LAX.

Copies of this patent may be obtained for five cents each, by addressing the "Commissioner of Patents, Washington, D. C."